(12) United States Patent
Reddy et al.

(10) Patent No.: US 10,740,064 B1
(45) Date of Patent: Aug. 11, 2020

(54) TECHNIQUES FOR DYNAMIC SYNTHESIS OF MEDIA CONTENT

(71) Applicant: Amazon Technologies, Inc., Seattle, WA (US)

(72) Inventors: Gautham A. Reddy, Bothell, WA (US); Shrinidhi Shamasunder, Seattle, WA (US); Yogesh Mathur, Kirkland, WA (US); Kevin Sean Kelly, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/246,839

(22) Filed: Jan. 14, 2019

(51) Int. Cl.
*G06F 17/00* (2019.01)
*G06F 3/16* (2006.01)

(52) U.S. Cl.
CPC .................................. *G06F 3/165* (2013.01)

(58) Field of Classification Search
CPC ................................................. G06Q 30/0276
See application file for complete search history.

(56) References Cited

U.S. PATENT DOCUMENTS

| | | | | |
|---|---|---|---|---|
| 2007/0171788 A1* | 7/2007 | Yokoyama | ......... | G01C 21/3629 369/47.16 |
| 2008/0292265 A1* | 11/2008 | Worthen | ............... | G11B 27/034 386/282 |
| 2010/0067882 A1* | 3/2010 | Axen | .................... | G11B 27/031 386/241 |
| 2014/0297377 A1* | 10/2014 | Bhat | .................. | G06Q 30/0276 705/14.5 |
| 2015/0088621 A1* | 3/2015 | Shinohara | ............... | H04L 67/10 705/14.4 |

* cited by examiner

*Primary Examiner* — Joseph Saunders, Jr.
(74) *Attorney, Agent, or Firm* — Kilpatrick Townsend & Stockton LLP

(57) ABSTRACT

Described herein are a system and techniques for dynamically generating targeted media content. In some embodiments, the system identifies an appropriate template based on the content currently being consumed by a user, preferences or attributes associated with that user, a product to be presented, or any other suitable factor. Once a temple has been selected, a product may be selected for presentation to the user based on the content currently being consumed by a user, preferences or attributes associated with that user, or any other suitable factor. The selected template is then populated using attributes of the user and/or the product. Once populated, the text in the populated template may be smoothed. The generated content may then be synthesized into a different format, in order to match a format of content currently being consumed by a user, which may then be presented to the user.

19 Claims, 8 Drawing Sheets

TECHNIQUES FOR DYNAMIC SYNTHESIS OF MEDIA CONTENT

BACKGROUND

The use of digital audio has drastically grown in popularity within the last few years. Users of mobile devices now spend numerous hours listening to audio content on those mobile devices. While automated advertising platforms have been developed and refined to reach consumers with image-based advertisements, attempts to provide targeted content to consumers in the digital audio space have been unsuccessful. Audio content creation typically requires the use of a studio. During its creation, making even small changes in an audio script can be costly in both time and money. Furthermore, even if multiple iterations of an audio content could be created, at best each of those iterations would be targeted toward a particular group of users and not toward a particular user.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Described herein are a system and techniques directed toward the dynamic generation of targeted media content. More particularly, the system described herein enables consumers of a particular format of media content to be provided with dynamically-generated content in that media format. In some embodiments, the system may dynamically generate media content by populating an appropriate template with attribute data, using one or more text sanitization techniques to smooth the language, and converting the populated template into an appropriate format. The media content generated by the system can then be presented to a user alongside, or interspersed with, other media content being consumed by the user.

The disclosure is primarily directed to the dynamic generation of targeted content via the use of templates. In some embodiments, the system identifies an appropriate template. This may be done based on the content (e.g., a category/type) currently being consumed by a user, preferences or attributes associated with that user, a product to be presented, or any other suitable factor. Once a template has been selected, a product may be selected for presentation to the user. This may be done based on the content currently being consumed by a user, preferences or attributes (e.g., a purchase history) associated with that user, or any other suitable factor. The selected template is then populated using attributes of the user and/or the product. Once populated, the text in the populated template may be smoothed. The text-based populated template may then be synthesized into a different format (e.g., audio or video), which may match a format of content currently being consumed by a user. The generated content may then be presented to the user.

Figure 1:
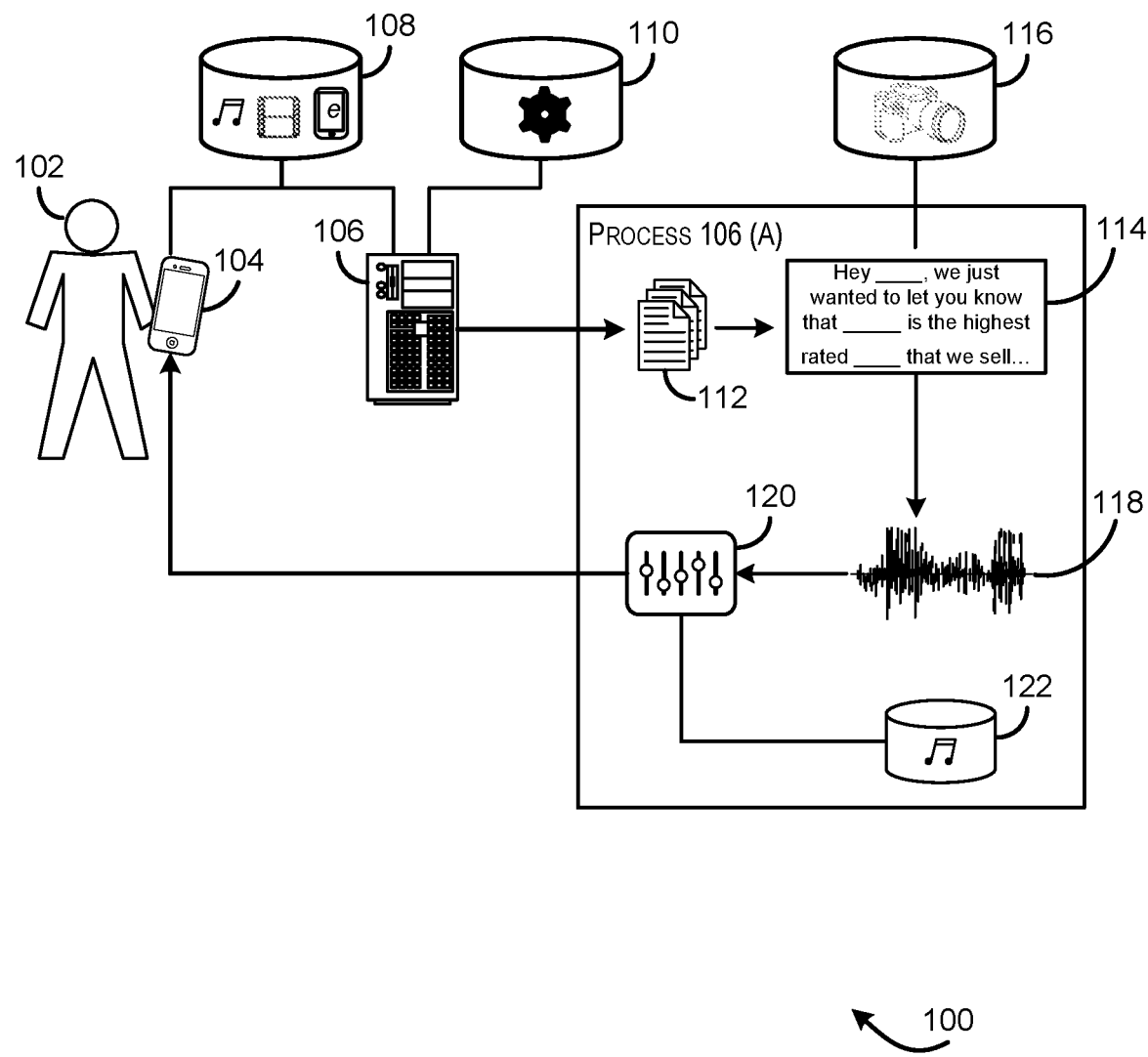
FIG. 1 depicts an exemplary system in which media content which is targeted to a particular user and/or a particular product can be dynamically generated and presented to that user in accordance with at least some embodiments.

FIG. 1 depicts an exemplary system 100 in which media content which is targeted to a particular user and/or a particular product can be dynamically generated and presented to that user in accordance with at least some embodiments. In FIG. 1, a user 102 may operate a user device 104 in order to consume media content. In accordance with at least some embodiments, a service provider 106 may receive a request to serve media content (e.g., an advertisement) to the user device 104. In these embodiments, the service provider 106 may identify attribute data 108 for content currently being consumed, and/or having been consumed in the past, by the user 102. In some embodiments, the service provider 106 may also identify the user 102 and may identify user attributes and/or user preferences 110 for that user. The service provider may then dynamically generate media content to be served to the user device 104 in accordance with the techniques described in greater detail below.

A service provider 106 computer may be any computing device configured to perform at least a portion of the functionality described herein. In particular, the service provider 106 may be configured to dynamically generate targeted media content upon request. In some embodiments, the service provider 106 may receive an indication of a content, or type of content, which is being consumed by the user device 104. In some embodiments, the service provider 106 may receive an indication of an identity of a user 102 for whom the content is being generated. The service provider 106 may then dynamically generate content via a process 106 (A), which is described at a high level with respect to FIG. 1 and in greater detail below.

In some embodiments of process 106 (A) as depicted, the service provider may first select a template 114 to be used to generate the content. In some embodiments, the template 114 may be selected from a plurality of available templates 112. The selection of a particular template 114 from the plurality of templates 112 may be made by the service provider 106 based on a number of different factors. For example, in some cases the service provider 106 may select a template 114 based on the content or the type of content being consumed by the user device 104. In another example, the template 114 may be selected from a plurality of templates 112 based on one or more attributes or preferences associated with the user 102. In some embodiments, the template 114 itself may be dynamically generated. For example, each template may comprise a number of sections, such as an introduction, a product presentation, and a call to action. In these embodiments, template 114 may be generated by selecting and combining an appropriate selection from each respective section. In some embodiments, the template 114 may include a number of data fields to be populated with specific data. It should be noted that some generated content may have additional, or fewer, sections than other generated content. For example, a generated content that is an awareness campaign may lack a call to action.

Continuing with process 106 (A), the service provider 106 may populate the selected template 114 with attributes associated with one or more products. In some embodiments, the service provider 106 may select a product that may be of particular interest to a user 102. The selection of a product of particular interest to the user 102 may be made based on information stored in association with the user (e.g., user data 110), based on content (or a type of content) consumed by the user device 104, or any other suitable factor. In some embodiments, a template 114 may be selected by the service provider from the plurality of templates 112 based on the product or type of product for which the template is to be populated. In some embodiments, the service provider 106 may maintain a data store of product details 116. For example, the service provider 106 may maintain a product catalog which includes products (e.g., goods and/or services) available for purchase. When populating the template 114, the service provider 106 may, for each data field in the template to be populated, identify an attribute of a product which corresponds to the data field and populate the data field with a value stored in relation to that attribute.

Once the template 114 has been populated, the service provider 106 may need to smooth out the generated content using one or more text sanitization techniques. For example, the service provider 106 may use one or more natural language processing (NLP) techniques to replace and/or rewrite one or more phrases in the populated template. The service provider 106 may remove technical terms and replace them with colloquial equivalents to help with the flow of the content. In some embodiments, the service provider 106 may process the generated content to achieve a particular tone or sentiment.

In some embodiments, the generated content may be converted to a different media format. For example, content may be generated in a message having a text format and then converted into a message 118 having an audio format. In some embodiments, the service provider 106 may need to perform additional processing on this content. For example, it may be necessary to remove any significant "pauses" or empty space in the audio. In some embodiments, the generated content may also be confined by a specified amount of time within which the content can be played. In these embodiments, the service provider 106 may also compress or expand the audio file to fit the specified amount of time.

In some embodiments, an audio content generated using the techniques described herein may be subjected to sound mixing software (a "mixer") 120 in order to add in sound effects and/or background noises selected from sound data 122 stored by the service provider 106. In some embodiments, background music to be mixed into the audio content may be selected based on the content being consumed by the user device 104. In some embodiments, background music to be mixed into the audio content may be indicated with respect to the selected template 114.

In accordance with embodiments of the disclosure, media content may include any visual or audio content capable of being presented on the user device 104 in order to be consumed by the user 102. Some examples of media content may include movies, games, reading material (e.g., a web page or an ebook), music, an audio book, or any other suitable visual or audio material. The terms "targeted," "tailored," or "customized," when used in relation to media content (e.g., targeted media content) may refer to content including subject matter determined to be of particular interest to a specific user or group of users.

In some embodiments, media content may be hosted by, or managed by, a content provider which is separate from the service provider 106. In some of these embodiments, the user device 104 may not be in direct communication with the service provider 106. For example, the user device 104 may be used to access streaming media content provided by a streaming media content provider. In this example, the streaming media content provider may request dynamic content from the service provider 106. Upon receiving a response from the service provider 106 that includes the requested media content, the streaming content provider may serve the received media content to the user device 104.

For simplicity of illustration, a certain number of components are shown in FIG. 1. It is understood, however, that embodiments of the disclosure may include more than one of each component. In addition, some embodiments of the disclosure may include fewer than or greater than all of the components shown in FIG. 1. In addition, the components in FIG. 1 may communicate via any suitable communication medium (including the internet), using any suitable communications policy. In at least some embodiments, each component of the depicted architecture may represent one or more special purpose devices configured to perform the described functions. In some embodiments, each component of the depicted architecture may comprise a cluster or group of devices that each perform the same, or a similar, function.

Figure 2:
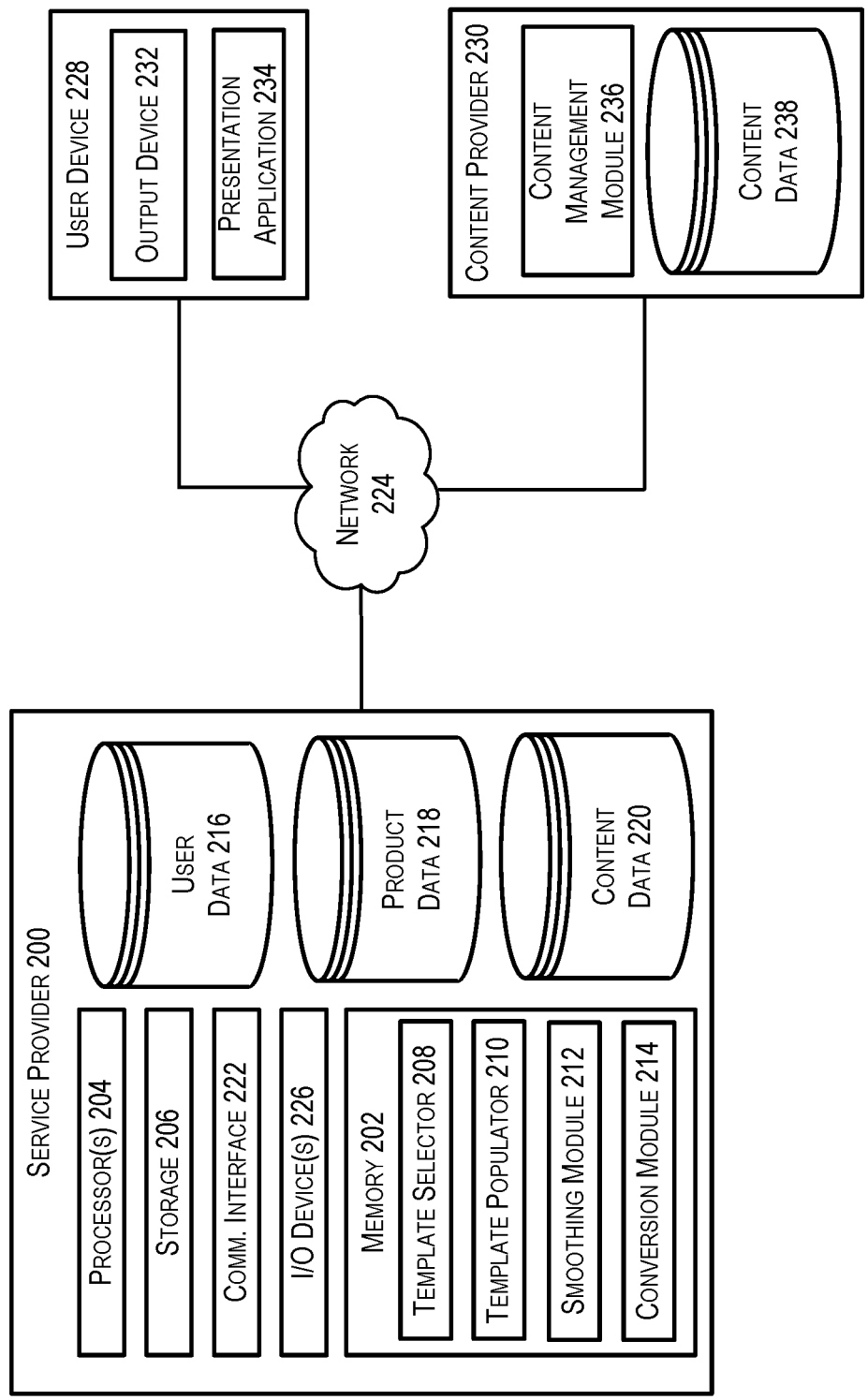
FIG. 2 depicts a diagram of an exemplary service provider computer that may be configured to dynamically generate tailored advertisements for a user in accordance with at least some embodiments.

FIG. 2 depicts a diagram of an exemplary service provider computer 200 that may be configured to dynamically generate tailored advertisements for a user in accordance with at least some embodiments. The service provider computer 200 may be an example service provider computer 106 described with respect to FIG. 1.

The service provider computer 200 may be any type of computing device capable of identifying a user, identifying a product appropriate for that user, and dynamically generating an advertisement directed toward the user and the respective product. In at least some embodiments, the service provider computer 200 may include at least one memory 202 and one or more processing units (or processor(s)) 204. The processor(s) 204 may be implemented as appropriate in hardware, computer-executable instructions, firmware or combinations thereof. Computer-executable instruction or firmware embodiments of the processor(s) 204 may include computer-executable or machine executable instructions written in any suitable programming language to perform the various functions described.

The memory 202 may store program instructions that are loadable and executable on the processor(s) 204, as well as data generated during the execution of these programs. Depending on the configuration and type of service provider computer 200, the memory 202 may be volatile (such as random access memory (RAM)) and/or non-volatile (such as read-only memory (ROM), flash memory, etc.). The service provider computer 200 may also include additional storage 206, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the service provider computer 200. In some embodiments, the memory 202 may include multiple different types of memory, such as static random access memory (SRAM), dynamic random access memory (DRAM) or ROM.

Turning to the contents of the memory 202 in more detail, the memory 202 may include an operating system and one or more application programs or services for implementing the features disclosed herein including at least a module for selecting and/or generating a template (template selector 208), a module for populating selected template (template populator 210), a module for smoothing text in a populated template (smoothing module 212), and/or a module for converting a populated template from one form of media to another (conversion module 214). The memory 202 may also include a number of data stores, including user data 216, which maintains information associated with individual users, product data 218, which maintains information associated with various products, and/or content data 220, which may include information about media files.

In some embodiments, the template selector 208 may, in conjunction with the processor 204, be configured to select an appropriate template from a plurality of available templates. In some embodiments, the selection of a particular template from the plurality of template may be made based on attributes of a user, attributes of content consumed by the user, and/or attributes of a product with respect to which the content is to be generated. For example, the template may be selected based on a tone or sentiment which is determined to be most effective for a particular user. The service provider may determine that the user, in a particular case, responds in a more positive manner to content presented in a formal tone. In this example, the template selector 208 may select a template which is associated with a formal tone. In some embodiments, the template may be selected based on a tone of the content being consumed by the user. For example, if the user is currently consuming an audio book which is indicated as being a comedy, then a template associated with a humorous or casual tone may be selected. In some embodiments, a template may be selected based on preferences stored with respect to a particular user or group of users. For example, if a user has indicated that a particular product attribute (e.g., rating, price, durability, etc.) is most important when purchasing a product, then the template selector 208 may select a template that highlights that product attribute.

In some embodiments, the template populator 210 may, in conjunction with the processor 204, be configured to populate a template selected by the template selector 208 with information pertaining to a particular product. In some embodiments, the template populator 210 may first identify (e.g., using one or more item recommendation techniques) a product which should be advertised to the user. In some embodiments, the product may be selected based on user preferences and/or purchase history. In some embodiments, the product may be selected based on its relevance to content being consumed by the user. For example, if the user is listening to an audio book that explains the advantages of a particular category of products, then the template populator 210 may identify a product within that category to be presented to the user. In some embodiments, the template populator 210 may be provided with an indication of a product with respect to which the dynamic content is to be generated.

Once a product has been identified, the template populator 210 may populate one or more data fields of the selected template with attributes associated with the product, consumed content, and/or the user. In some embodiments, a template may include portions of text as well as empty data fields, wherein each of the empty data fields may be associated with a particular attribute. In this example, the template populator 210 may, for each empty data field, query one or more data stores for a value assigned to the particular attribute corresponding to that data field. In this way, each empty data field may be populated with an initial value.

In some embodiments, the smoothing module 212 may, in conjunction with the processor 204, be configured to "smooth out" or sanitize the language of a populated template. In some embodiments, the smoothing module 212 may use one or more natural language techniques to rephrase the wording of the populated template. In some embodiments, the smoothing module 212 may rephrase the wording of the populated template in order to achieve a desired tone. For example, in order to achieve a more casual tone, the smoothing module 212 may replace objective or technical terms with subjective or relative terms. By way of illustration, when referring to a laptop having a screen of size 24 inches, the smoothing module 212 may determine that the size of the screen is larger than the size of an average laptop screen and may replace wording of "a screen of twenty four inches" with "a large screen." In some embodiments, the service provider 200 may maintain a data store which relates words to a particular tone or sentiment, such that the smoothing module 212 may access that data store to achieve that particular tone.

In some embodiments, the conversion module 214 may, in conjunction with the processor 204, be configured to convert a generated content from one format to another. For example, in the scenario that a user is consuming audio media content, a dynamic content may first be generated in a text format. In this example, the dynamic content may then be converted into an audio format so that it can be consumed by the user. To do this, the conversion module 214 may use one or more text to speech synthesis applications. In some embodiments, the conversion module 214 be configured to apply a particular accent or dialect to the converted content based on what has been determined to be effective for the target user. In some embodiments, the conversion module 214 may be configured to remove any long pauses (e.g., pauses that last for over a threshold amount of time) from the converted audio. The conversion module 214 may also be configured to compress or expand the converted audio in order to fill a predetermined time period (e.g., 15 seconds, 30 seconds, etc.). In some embodiments, the conversion module 214 may be configured to mix the converted content with background elements (e.g., background music). In some embodiments, one or more words or phrases in the converted content may be presented in a pitch, intonation, and/or tempo selected to convey a particular tone.

The data stored in databases 216, 218, and 220 may be dynamic, static, or some combination of dynamic and static data. In some embodiments, user data 216 may include any information about users. For example, user data 216 may include demographic data, internet search history data, purchase history data, advertisement effectiveness data, clickstream data, or any other suitable information related to the user. In some embodiments, product data 218 may include any information about products. For example, the product data 218 may include information about product attributes, a product category, user reviews, or any other suitable information related to the product. Information stored in product data 218 may be provided by a manufacturer of a product, a retailer, a user (e.g., via customer feedback), or any other suitable entity. In some embodiments, content data 220 may include any information pertaining to media files. For example, the content data 220 may include an indication of a type or category for each media file, products associated with particular media files (or portions of media files), media file play times, or any other suitable information related to media files.

The service provider computer 200 may also contain communications interface(s) 222 that enable the service provider computer 200 to communicate with a stored database, another computing device or server, one or more remote devices, and/or any other suitable electronic devices. In some embodiments, the communication interface 222 may enable the service provider computer 200 to communicate with other electronic devices on a network 224 (e.g., on a private network). The service provider computer 200 may also include input/output (I/O) device(s) and/or ports 226, such as for enabling connection with a keyboard, a mouse, a pen, a voice input device, a touch input device, a display, speakers, a printer, etc.

The service provider computer 200 may be in communication with a number of user devices 228 and/or content providers 230. Each of the user devices 228 may be capable of interacting with the service provider 200 or content provider 230 to access an account or view content. For example, the user devices 228 may include a web browser or other application that enables a user of the user device 228 to access a website maintained by the service provider 200 or content provider 230.

The user device 228 may include one or more output devices 232 capable of presenting content to a user of the user device 228. For example, the output devices 232 may include one or more displays and/or speaker devices capable of playing visual or audio content. In some embodiments, the user device 228 may include a presentation application 234, which may be a set of computer executable instructions (e.g. an application) which, when executed, causes the user device 228 to present media content to a user. In some embodiments, a presentation application 234 may be an application which is maintained on behalf of, and supported by, a particular content provider 230. For example, in some embodiments, the presentation application 234 may be used to access media content made available by the content provider 230. In some embodiments, each of the user devices 220 may be independently capable of storing (e.g., in memory) media content (e.g., a dynamically generated content). In some embodiments, each user device 228 may be capable of continuously receiving media content from a content provider 230 (e.g., streaming media) and presenting the received media to a user.

In some embodiments, a content provider 230 may be any computing device capable of providing content (i.e., media content) to a user device 228. In some embodiments, the content provider 230 may include, in its memory, one or more modules for making content accessible to a user device 228 to be played (content management module 236). In some embodiments, the content provider 230 may store content data 238, which may include media content. The content provider 230 may provide access to content data 238 to a user device. In some embodiments, the content data 238 may be stored on a computing device which is separate from the content provider 230. For example, the content data 238 may be stored by, and retrieved from, a third party computing device. In at least some of these embodiments, the content provider 230 may provide a pointer or link, and in some cases a cryptographic key, to a user device 228 for particular content stored in the content data 238. In these embodiments, the user device 228 may be configured to access content via the provided pointer or link.

With respect to the example architecture depicted in FIG. 2, various components may interact in a number of ways to enable the functionality described herein. In an exemplary interaction, a user device 228 may consume content (e.g., media content) managed by a content provider 230. In this example scenario, the content provider 230 may determine that the user device 228 should be served an advertisement. The content provider 230 may then request an appropriate advertisement from the service provider 200. In the request, the content provider 230 may provide an identifier of the user, a time period or amount of time, an identifier for content currently being consumed by the user device, or any other suitable information. The service provider, upon receiving the request for an advertisement, may generate dynamically an appropriate advertisement, which it may then provide to the content provider 230 by way of response to the request. The content provider 230 may subsequently serve the generated advertisement to the user device 228. This example process is described in greater detail below.

In some embodiments, the service provider 200 may maintain an account with respect to one or more user devices 228. It should be noted that an account maintained by the service provider 200 for the user device 228 may be different from an account maintained by a content provider 230 for that same user device 228. In some embodiments, the content provider 230, when interacting with the service provider 200, may provide a user identifier that may be used by the service provider 200 to identify an account maintained by the service provider 200 for a particular user and/or user device 228.

Figure 3:
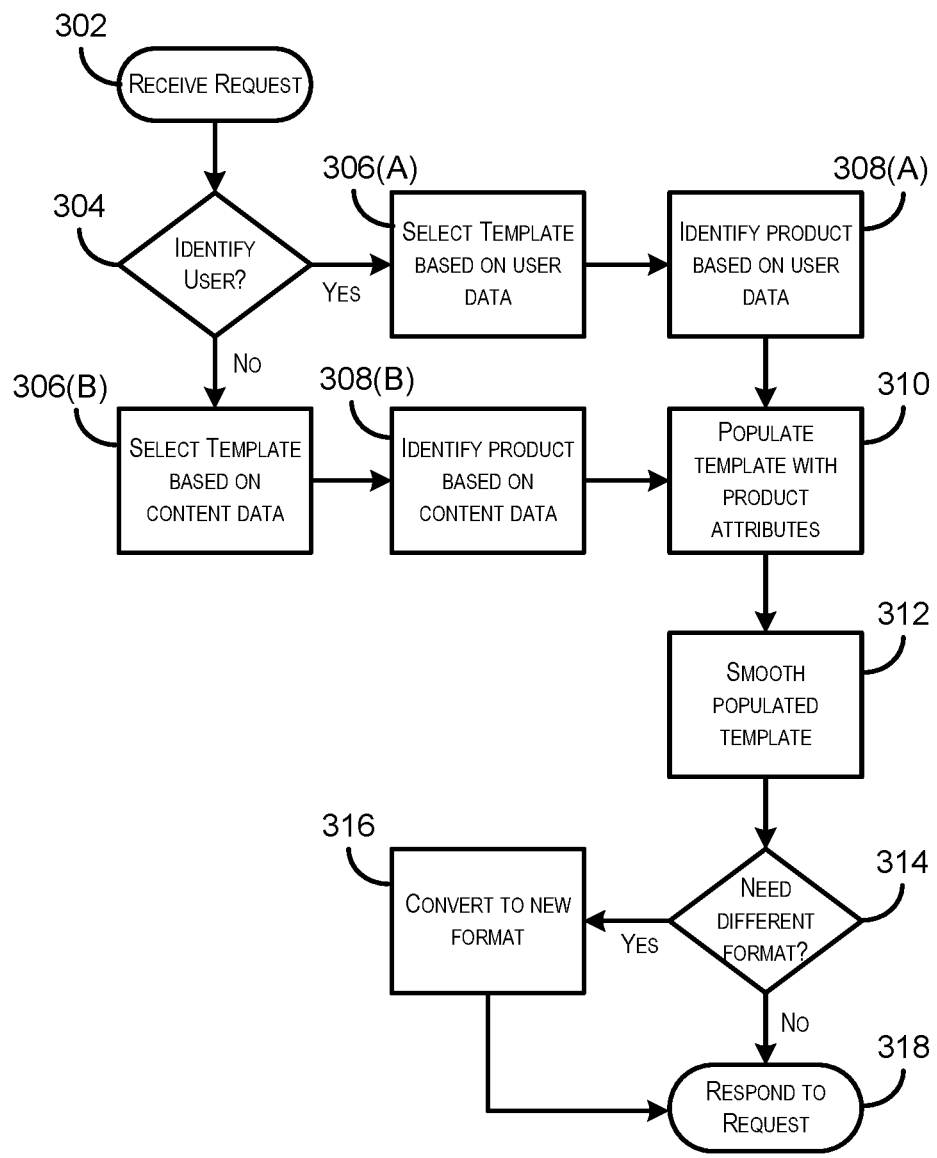
FIG. 3 depicts a flow chart illustrating an example process for dynamically generating targeted media content in accordance with at least some embodiments.

FIG. 3 depicts a flow chart illustrating an example process for dynamically generating targeted media content in accordance with at least some embodiments. The process 300 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement this process and any other processes described herein.

Some or all of the process 300 (or any other processes described herein, or variations and/or combinations thereof) may be performed under the control of one or more computer systems configured with executable instructions and may be implemented as code (e.g., executable instructions, one or more computer programs or one or more applications). In accordance with at least one embodiment, the process 300 of FIG. 3 may be performed by at least the service provider 200 depicted in FIG. 2. The code may be stored on a computer-readable storage medium, for example, in the form of a computer program including a plurality of instructions executable by one or more processors. The computer-readable storage medium may be non-transitory.

Process 300 may begin at 302, when a request for media content is received by the service provider. The request may include at least some identifying information. In some embodiments, the identifying information may include a user identifier that may be used to identify a particular user and/or user device. In some embodiments, the identifying information may include a content identifier that identifies content and/or a category of content that is being consumed in relation to the request. The request may also include other information, such as a time slot for the requested content, a product for which the requested content should be created, an indication of a channel or content category, and/or any other suitable information to be used in generating the requested content. In accordance with embodiments of this disclosure, a time slot may include a maximum amount of time that the content may take to play.

At 304, the process 300 may involve determining whether a particular user can be identified in relation to the received request. For example, the user identifier may be a phone number or name of the user for which content has been requested. In this example, the service provider may query a database to determine whether it is able to identify an account that it maintains which corresponds to the user for which the request has been created. In some embodiments, the user may not be able to be identified from the request. For example, the user may not have an account with the service provider. In another example, the request for content may not identify the user.

At 306, the process 300 may involve selecting a template from a plurality of available templates. The selection of a template from the plurality of templates may be made based on a number of factors. In some embodiments, the process 300 may diverge depending on whether the service provider is able to identify a user at 304. These divergent steps are described below with respect to 306 (A and B).

In 306 (A), the process 300 may involve selecting a template based on one or more attributes associated with the identified user. For example, the template may be selected based on attributes or preferences stored with respect to the user. It should be noted that preferences may be explicitly indicated by a user (e.g., via configuration settings) or they may be discerned based on a user's actions. In some embodiments, the service provider may record effectiveness metrics with respect to particular templates or types of templates for a particular user. For example, the service provider may determine that content presented in a formal tone is 45% more effective (e.g., results in a user responding to a call to action 45% more times) than content presented in a casual tone. In this example, the service provider may select a template that facilitates the generation of content in a more formal tone.

In 306 (B), the process 300 may involve selecting a template based on one or more attributes associated with the content currently being consumed. For example, the template may be selected based on an association between a particular content (or type of content) and a template. For example, the service provider may receive an indication that the user is currently reading an audio book that is categorized as "humorous." The service provider may also determine that content presented in a casual tone is typically most effective for people who consume humorous content. Based on receiving the indication that the user is consuming humorous content, the service provider may select a template that facilitates the generation of content in a more casual tone. In another example, the service provider may identify a template that corresponds to a particular type of music that the user is listening to. By way of illustration, upon determining that the user is listening to pop music, the service provider may select a template which presents content in a more "upbeat" manner.

At 308, the process 300 may involve selecting a product from a set of products available from the service provider. The selection of a particular product may be made based on a number of factors. Similar to the process at step 306, the process 300 may diverge at step 308 depending on whether the service provider is able to identify a user at 304. These divergent steps are described below with respect to 308 (A and B).

In 308 (A), the process 300 may involve selecting a product from a set of products available from the service provider based on one or more attributes or preferences stored with respect to the user. As pointed out above, user preferences may be explicitly indicated by a user (e.g., via configuration settings) or they may be discerned based on a user's actions. For example, if the user searches for a product within a webpage managed by an electronic retailer and focuses on a particular feature or metric, then the service provider may store an indication that the feature or metric is important for that particular user. By way of illustration, a user may conduct a search for "highest rated vacuum," from which the service provider may discern that the user places much weight on user reviews or ratings. By way of a second illustration, the user may search for "highest volume pressure cooker," from which the service provider may discern that the user, with respect to at least pressure cookers and possibly other kitchen appliances, places much weight on the ability to cook large quantities of food. In some embodiments, a type or category of product to be presented to a user may be selected based on products that the user has viewed and/or purchased in the past. In some embodiments, a type or category of product to be recommended to the user may be selected based on the content indicated as being consumed by the user and/or content consumed by the user in the past.

In 308 (B), the process 300 may involve selecting a product from a set of products available from the service provider based on one or more attributes associated with the content currently being consumed. For example, the product may be selected based on an association between a particular content (or type of content) and a product or category of products. For example, the service provider may receive an indication that the user is currently listening to an audio book that espouses the benefits of barefoot running. In this example, the service provider may identify a product categorized as a "barefoot running shoe." In some embodiments, the service provider may create associations between content and products by identifying purchasing trends. For example, the service provider may note that people who consume a particular type of content often purchase a specific product or type of product.

At 310, the process 300 may involve populating the selected template with information about the selected product. For example, the template may include some portion of text as well as a number of empty data fields to be populated. Each data field may include an indication of a type of data that should be populated into that data field. For example, a data field may indicate a database column (e.g., from a product database table such as product data 218) that pertains to that data field such that the data field may be populated with a value stored in the database column and at a row associated with the selected product. In the scenario in which the service provider is able to identify the user, the template may also include data fields to be populated with information associated with the user. Each of the data fields in the selected template may be populated with values retrieved from one or more databases by querying those databases.

At 312, the process 300 may involve smoothing the populated template. In accordance with embodiments of this disclosure, the term "smoothing" or "sanitizing" may refer to any techniques used to remove irregularities or awkwardness from a piece of content. Smoothing the populated template may involve replacing one or more terms in the template, removing redundancies from the template, removing or adding words or phrases, or any other suitable editing of the template. In some embodiments, smoothing the template may involve replacing one or more terms in the template. For example, smoothing the populated template may involve using one or more natural language processing techniques to improve a readability of the populated template or to ensure a consistent tone. By way of illustration, technical terms in the template may be replaced with colloquial terms or vice versa. By way of a second illustration, objective values in the template may be replaced with subjective values in order to impact the tone of the template or vice versa.

At 314, the process 300 may involve determining whether a different format is required for the populated template. In some embodiments, the service provider may determine that the generated content should be in a format that matches the format of content currently being consumed by the user. For example, if the user is listening to audio, then the service provider may determine that the generated content should be converted into audio as well. If the service provider determines that the generated content should be converted into a second format, then the process may involve doing so at 316. Otherwise, the service provider may respond to the received request with the generated content at 318. Converting the populated template from a first format to a second format may involve any suitable conversion techniques. For example, converting the populated template from a text format to an audio format may involve the use of speech synthesis techniques.

At 318, the process 300 may involve providing the content to the requestor via a response to the received request. In some embodiments, the requestor may be a third-party entity (e.g., a content provider), which may or may not be affiliated with the service provider. The generated content may be incorporated into content being consumed by the user. In some embodiments, the service provider may provide the generated content directly to a user (e.g., via a user device associated with the user). In some embodiments, the content may be presented alongside supplemental content, such as a banner advertisement or other visual content.

In some embodiments, the process may further involve adjusting one or more effectiveness values or metrics based on information received in relation to the presented content. For example, the process may further involve identifying a level of interaction between the user and the presented content and updating an effectiveness of the template (and other factors) used in creating the content. In this example, the system may note whether the user completely ignored the advertisement, completed the call to action, or performed some action in between (e.g., clicked on an accompanying banner advertisement but then canceled out). In some embodiments, the user may be presented with an opportunity to skip the content once they have reached some point within the content. In at least some of these embodiments, effectiveness metrics may be obtained based on whether the user has skipped the content. In some embodiments, a service provider may determine that the user has purchased the product in the content at some point after presentation of the content to the user. The service provider may then update effectiveness metrics for the template (and/or other factors) used in generating the content at that time. In some embodiments, the effectiveness metrics may be updated based on a value that varies with the amount of time that has passed since presentation of the content. It should be noted that the ease with which content can be dynamically generated and presented to a user in this system make it ideal for experimentation, which may not be possible (or may be prohibitively expensive) in conventional advertising systems.

Figure 4:
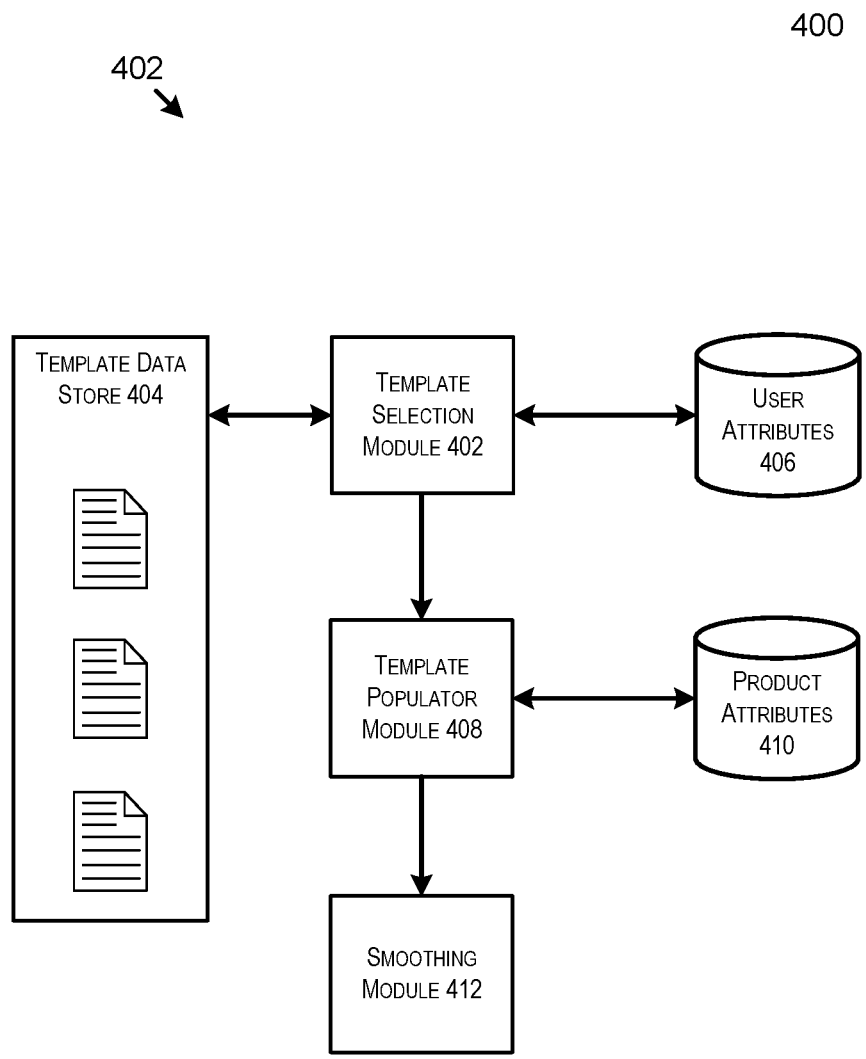
FIG. 4 depicts a block diagram illustrating an example process for selecting and populating a template in accordance with at least some embodiments.

FIG. 4 depicts a block diagram illustrating an example process 400 for selecting and populating a template in accordance with at least some embodiments. In accordance with at least some embodiments, the service provider may generate content by first selecting, and then populating, a template with product attributes. The process 400 may begin upon initiation of a template selector module 402, which may be an example of the template selector 208 as depicted in FIG. 2.

In some embodiments, the process 400 may involve selection of a template from a template data store 404. The selection of a template from the plurality of templates may be made based on a number of factors. In some embodiments, the template may be selected based on attributes or preferences 406 stored with respect to the user. In some embodiments, the template may be selected based on an association between a particular content (or type of content) and a template. For example, the service provider may select a template based on a type or category of content currently being consumed by a user associated with the content to be generated.

In accordance with embodiments of the disclosure, a template may be any file having some combination of static and dynamic elements that can be used to generate a piece of content. In some embodiments, the template may include a number of sections. For example, as depicted below, a template may include an "Intro" section, a "Product" section, and a "Call to Action" section. In some embodiments, a template may be a text-based document. For example, a template may be an Extensible Markup Language (xml) file. By way of illustration, a sample of an xml file that may be used as a template is shown below:

```
<Template tone="casual" user_cond="user_known" focus="user_rating">
    <Intro>
        <text> Hi</text>
        <data_field> user_name </data_field>
        <text> We just wanted to tell you that </text>
    </Intro>
    <Product>
        <data_field> product_name </data_field>
        <text> is the highest rated </text>
        <data_field> product_category </data_field>
        <text> that we sell </text>
    </Product>
    <Call_to_Act>
        <text> To get yours, simply </text>
        <action> purchase_action </action>
    </Call_to_Act>
</Template>
```

In the sample xml provided above, one skilled in the art would recognize that the template would be selected when the tone is intended to be casual, the user has been identified, and (based on information stored about the user) the user has been determined to focus on user ratings when purchasing products. It should be noted that while an xml document is used to illustrate a potential embodiment in the above example, templates may be generated from any suitable text-based document. For example, a template may be generated using JavaScript Object Notation (JSON).

In some embodiments, the process 400 may involve invoking a template populator module 408, which may be configured to select an appropriate product and populate the selected template with information about the selected product. The template populator module 408 may be an example of the template populator 210 as depicted in FIG. 2. In this portion of the process, each of a number of empty data fields within the selected template may be populated with product and/or user data associated with that data field. For example, a data field may be populated with a value from a product attributes database table 410.

By way of illustration, the example template described above includes a number of text portions interspersed with data fields. As depicted, each data field is associated with an attribute name (e.g., user_name, product_name, product_category, etc.). In populating the example template, the template populator module 408 may create a string of text by appending to that string each text portion or a value associated with a data field in the order that it appears. The template may also be populated with a "call to action," which may identify, and be linked to, an action that can be taken by the user to initiate a purchase of the respective product. For example, a call to action may comprise the text "say purchase." In this example, the call to action may be linked to functionality that, when activated, causes a listening device on a user device playing the content to listen for the word "purchase" for some period of time after playing the call to action.

In some embodiments, the process 400 may involve invoking a smoothing module 412, which may be configured to smooth the text within the populated template. The smoothing module 412 may be an example of a smoothing module 212 as depicted in FIG. 2. In some embodiments, the smoothing module 212 may utilize one or more text sanitization (e.g., natural language processing) to replace or rephrase portions of the text in the populated template. In some embodiments, the smoothing module 212 may ensure that the flow and content of the text is consistent with a particular tone or them. For example, the smoothing module 212 may replace words or phrases to achieve a particular tone. In a first example, the smoothing module 212 may replace objective terms with subjective terms or vice versa. In a second example, the smoothing module 212 may replace technical terms with their colloquial equivalents and vice versa.

Figure 5:
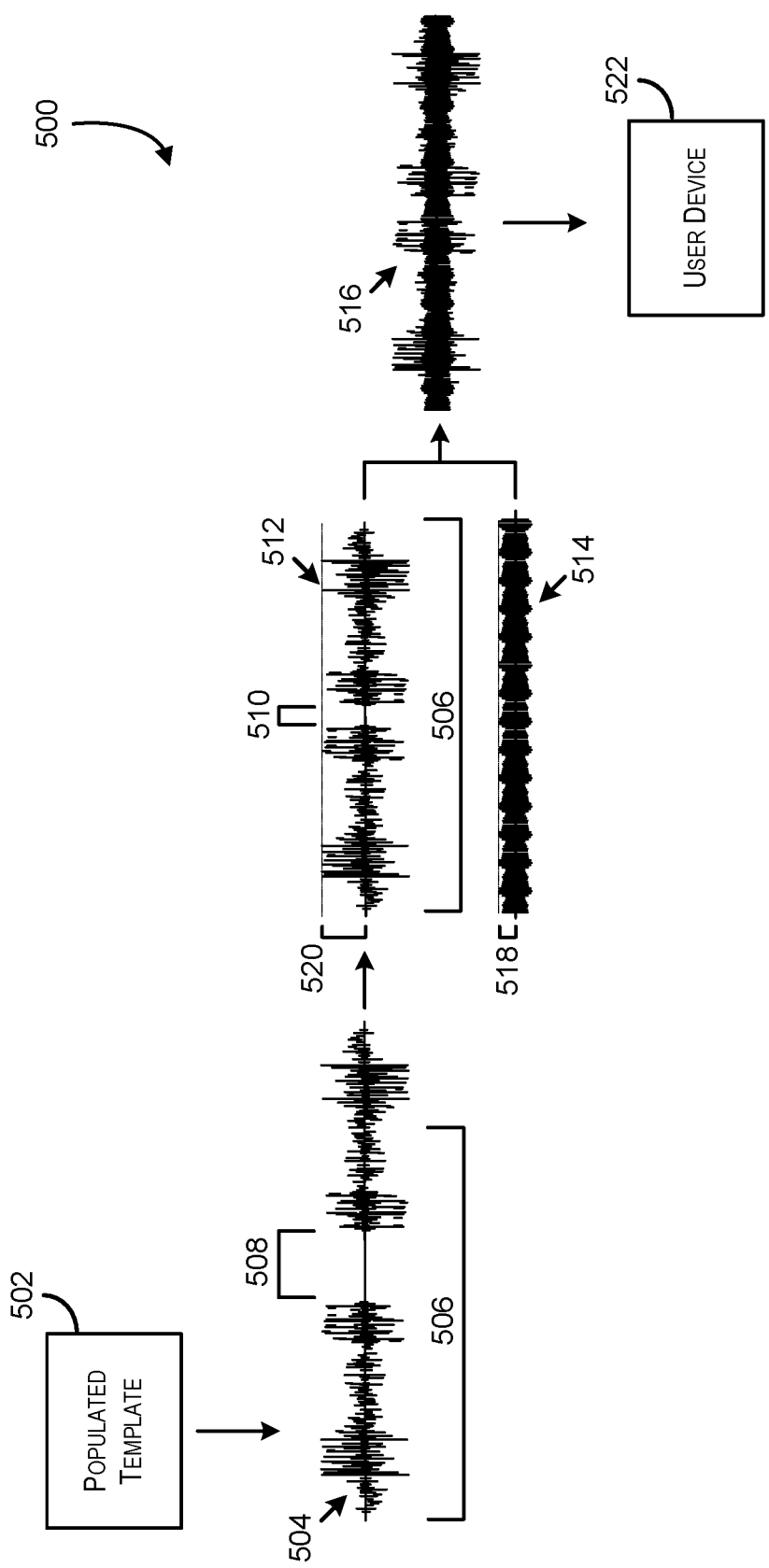
FIG. 5 depicts a block diagram illustrating an example process for generating and fixing audio from a populated template in accordance with at least some embodiments.

FIG. 5 depicts a block diagram illustrating an example process 500 for generating and fixing audio from a populated template in accordance with at least some embodiments. In FIG. 5, the process may begin upon receiving a populated template 502. In some embodiments, content may first be generated in a text-based format and subsequently converted into a different format. As depicted, the content may be converted into an audio format. In this process, a populated template 502 may be subjected to a speech synthesizer application to convert the text in the populated template 502 to a rough speech soundbite 504.

In some embodiments, the service provider may receive one or more constraints with respect to which a media file is to be generated. For example, the service provider may receive a time slot 506 within which the generated content must fit. In this example, the time slot 506 may represent some amount of time within which the audio file should be played. In another example, a constraint provided to the service provider may be an accent, gender, dialect, or some other suitable attribute to be used in generation of the rough speech soundbite 504. In some embodiments, a rough speech soundbite 504 may be compressed or extended in order to fit within the time slot 506. For example, upon determining that the rough speech soundbite 504 is longer than the allotted time slot, the speech may be sped up slightly to reduce the play time of the soundbite in order to fit it within the time slot 506.

In some embodiments, the service provider may identify gaps 508, or periods of silence, in the generated rough speech soundbite 504. The service provider may then determine, for each of the identified gaps 508 whether the gap is for an amount of time over a threshold time. If the service provider detects a gap 508 longer than the threshold time, then the service provider may reduce the gap 510 by removing at least a portion of the period of silence when generating a cleaned speech soundbite 512. In some embodiments, the gap 510 may be reduced in size (e.g., amount of time) to match the threshold amount of time in the cleaned speech soundbite 512.

In some embodiments, the cleaned speech soundbite 512 may be combined with a background element 514 to generate a final speech soundbite 516. In some embodiments, the background element 514 may include a background noise or music. In some embodiments, when combining the cleaned speech soundbite 512 and the background element 514, a volume or amplitude 518 of the background element 514 may be adjusted so that it is some fraction of the volume or amplitude 520 of the generated cleaned speech soundbite 512.

In some embodiments, a final speech soundbite 516 may be generated by overlaying the cleaned speech soundbite 512 with the background element 514. Once a final speech soundbite 516 has been generated, the service provider may provide it to a user device 522. In some embodiments, the service provider may provide the final speech soundbite 516 to a content provider, which may in turn provide the final speech soundbite 516 to the user device 522.

Figure 6:
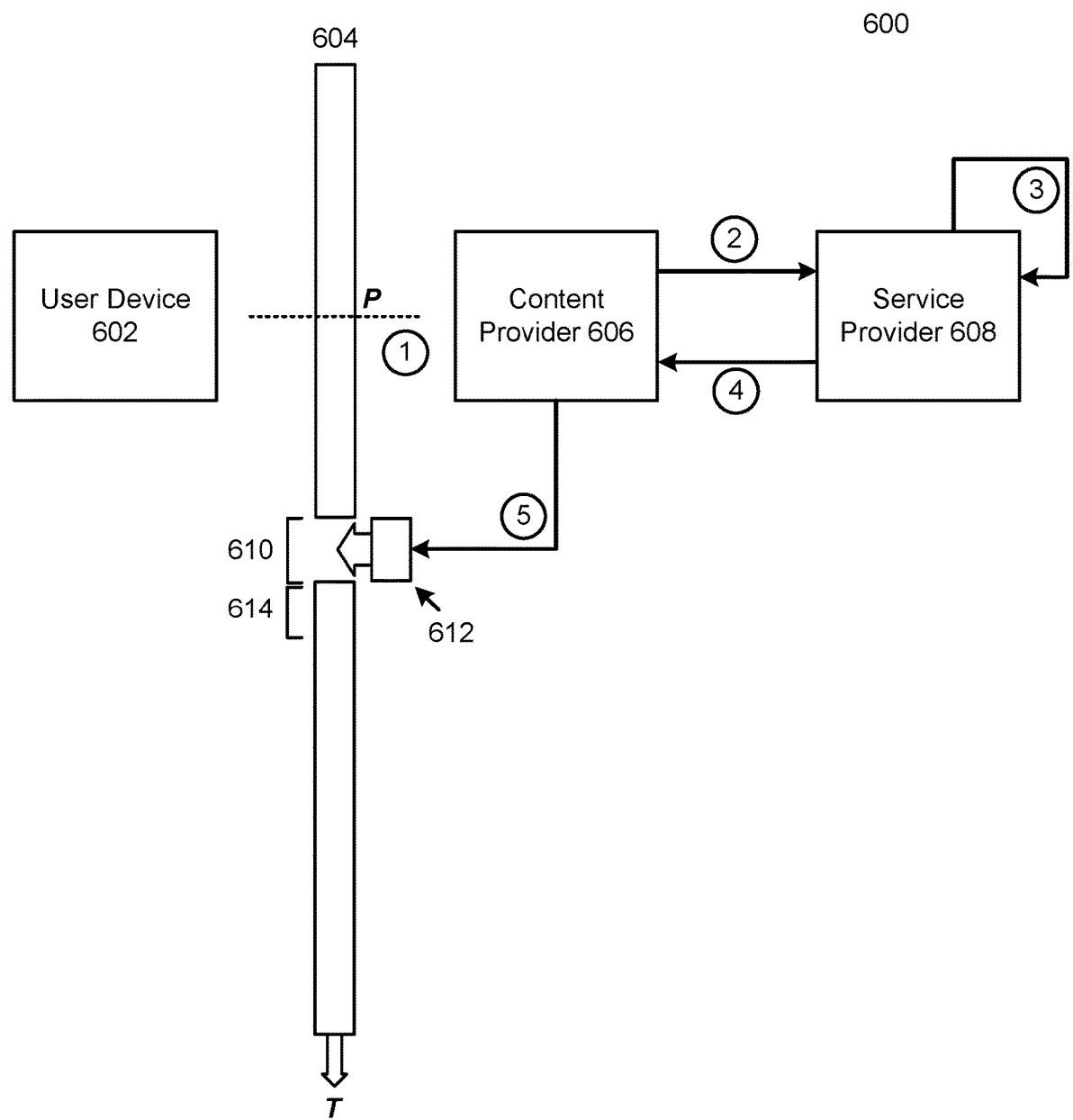
FIG. 6 depicts a block diagram illustrating an example process for providing dynamically-generated content in accordance with at least some embodiments.

FIG. 6 depicts a block diagram illustrating an example process 600 for providing dynamically-generated content in accordance with at least some embodiments. Depicted in FIG. 6 is a user device 602 which is consuming media content 604 over time T. The media content 604 may be streamed, or otherwise provided, to the user device 602 by a content provider 606. The user device 602 and/or the content provider 606 may be in communication with a service provider 608. The user device 602, the content provider 606, and the service provider 608 may be examples of a respective user device 228, the content provider 230, and service provider 200 as described with respect to FIG. 2 above.

With respect to the media content 604, the user device 602 may have reached a point P, which may be some point in time in a play time of the media content 604. In some embodiments, the content provider 606, upon detecting that the user device 602 has reached point P within the media content 604 at step 1, may identify a time slot 610 which should be filled with a dynamically-generated content. In some embodiments, the content provider 606 may make the determination to request dynamically-generated content upon reaching some point P, which is a predetermined amount of time before the time slot 610. In some embodiments, the time slot 610 may be a natural break in the playing of the media content 604. For example, the time slot 610 may represent a period of time between songs when streaming digital music, or between chapters when streaming an audio book. In some embodiments, the time slot 610 may be created by the content provider 606 (e.g., in order to generate advertising revenue).

Upon determining that dynamically-generated content should be provided, the content provider 606 may send a request to a service provider 608 at step 2. In some embodiments, the request may be implemented as a method call using an application programming interface (API) associated with the service provider 608. In these embodiments, information may be provided by the content provider 606 to the service provider 608 as parameters in the method call. In some embodiments, the content provider 606 may provide (e.g., within the request) the service provider 608 with information related to a user identifier, the time slot 610, a product to be presented, a type or category of the media content 604, an identifier for the media content 604, a media consumption history for the user device 602 (or a user associated with the user device 602), or any other suitable information. For the purposes of this disclosure, a user identifier may be any identifier that can be used to identify a particular user, user device, and/or account. For example, a user identifier may be a name, account number, phone number, or other suitable identifier.

Upon receiving the request for the dynamically-generated content, the service provider 608 may, using at least a portion of the information provided in the request, generate an appropriate dynamically-generated content 612 at step 3. The dynamically-generated content 612 may be any suitable type of media file. An example of the process that may be performed at step 3 is described in greater detail with respect to FIG. 3 as process 300. In some embodiments, the dynamically-generated content 612 may be created by the service provider 608 so that it fits within the time slot 610. In some embodiments, the dynamically-generated content 612 may be linked to a "call to action," which may be an action that can be taken by a user that views the content to interact with a product in the dynamically-generated content 612. For example, the dynamically-generated content 612 may be associated with a voice command that can be used to purchase the product by the user of the user device 602. In another example, the dynamically-generated content 612 may include a link to a webpage for the product that can be clicked on by the user of the user device 602.

At step 4, the service provider 608 may respond to the request by providing the dynamically-generated content 612 to the content provider 606. In some embodiments, the service provider 608 may provide an indication of an action associated with the dynamically-generated content 612. For example, the service provider may identify an action linked to the dynamically-generated content 612 via a call to action included within the dynamically-generated content 612. The content provider 606 may enable the identified action. In some embodiments, the service provider 608 may select a call to action to be included in the dynamically-generated content 612 based on one or more capabilities of the content provider 606. For example, the service provider 608 may include the use of a voice command to purchase a product if the content provider 606 is capable of receiving voice commands from the user device 602.

At step 5, the content provider 606 may provide the dynamically-generated content 612 to the user device 602. In some embodiments, the dynamically-generated content 612 may be streamed to the user device 602 during the identified time slot 610. The content provider 606 may make the transition from media content 604 to dynamically-generated content 612 as smooth as possible for the user device 602. In some embodiments, the content provider 606 may enable follow up action by the user device for some period of time 614 following the presentation of the dynamically-generated content 612. For example, the dynamically-generated content 612 may indicate that a user is able to purchase the presented product by simply saying "purchase" within the next 30 seconds. In this example, the content provider 606 may be configured to receive voice commands from the user device 602 for 30 seconds after the dynamically-generated content 612 has played. In some embodiments, the dynamically-generated content 612 may include an action that causes the user device 602 to communicate with the service provider 608. For example, the dynamically-generated content 612 may be a text-based message that includes a link to a product page (i.e., a webpage) maintained by the service provider 608 (or a separate entity). Upon selection of the link by a user of the user device 602, the user device 602 may be caused to open the product page in a web browser.

Figure 7:
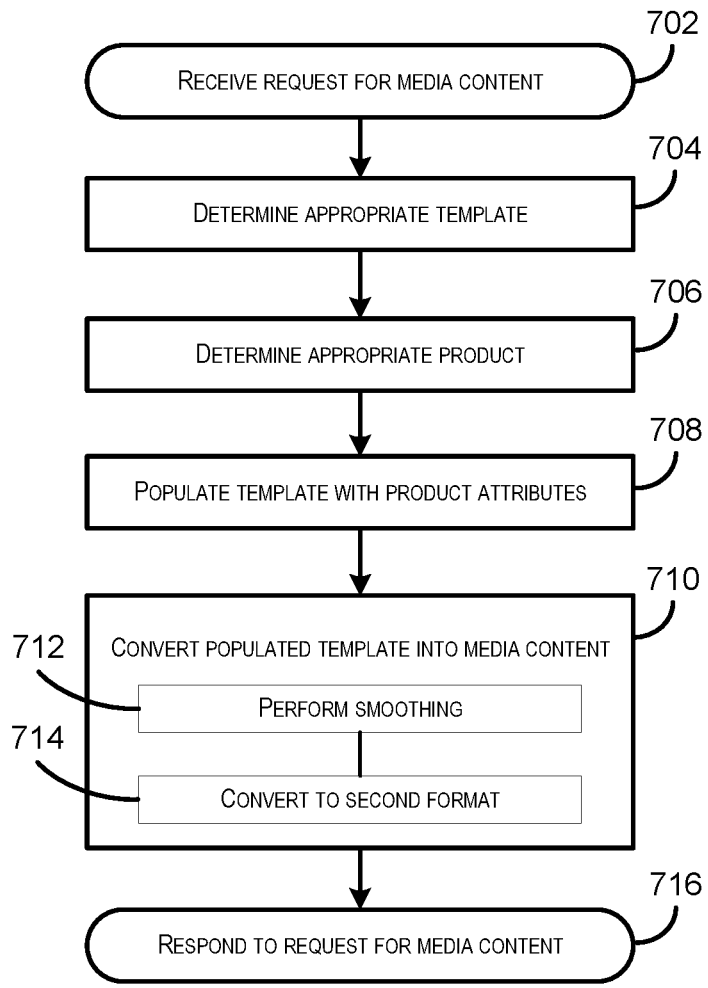
FIG. 7 depicts a flow diagram illustrating an example process for generating and providing dynamic targeted content in accordance with at least some embodiments.

FIG. 7 depicts a flow diagram illustrating an example process 700 for generating and providing dynamic targeted content in accordance with at least some embodiments. The process 700 may be performed by a service provider computer such as the service provider computer 200 described with respect to FIG. 2 above.

In some embodiments, process 700 may begin at 702, when a determination is made that a media file should be provided. In some embodiments, this may involve receiving a request for a media file from a content provider. In some embodiments, the service provider may also be a content provider and may determine that a media file should be provided upon detecting that one or more conditions have been met (e.g., a user has consumed some predetermined amount of content).

At step 704, the process 700 may involve determining an appropriate template to be used in generation of the media file. The identifying information may comprise a content data identifier that includes a category of the content consumed via the user device. In at least some embodiments, the template is determined from the plurality of templates based at least in part on the category of content. For example, the service provider may maintain a mapping between a category of content and a type of template to use when advertising to users that consume that content. The identifying information may comprise a user identifier. In some embodiments, the template is determined from the plurality of templates based at least in part on the user identifier. For example, the service provider may identify an account associated with the user based on the user identifier and may determine a template to be used based on an template effectiveness metrics stored in relation to that user. In some embodiments, the template may be an xml file.

At step 706, the process 700 may involve determining an appropriate product to be presented in the media file. In some embodiments, the product is determined from the plurality of products based at least in part on the category of content. For example, the service provider may maintain a mapping between a category of content and one or more products related to that category of content (e.g., related by subject matter or related by being frequently purchased in connection with the category of content). In some embodiments, the product is determined from the plurality of products based at least in part on the user identifier. For example, the product may be determined based on historical purchases made by the user.

At step 708, the process 700 may involve populating the determined template with one or more attributes associated with the determined product. In some embodiments, this may involve generating a string of text by appending text portions of the template and values for data fields in the template in the order that they appear. For example, for each text portion/data field, a template populator may append the text portion to the text string or look up a value in a database table associated with the data field and append that value to the text string. In some embodiments, at least some text may also be associated with an action. For example, the text may include a hyperlink that, when clicked on, causes a webpage to be opened.

At step 710, the process 700 may involve converting the populated template into the media file. This may involve smoothing the text at step 712 and/or converting the populated template into a different format at 714, each of which is described below.

At step 712, the process 700 may involve performing one or more smoothing operations. This may involve using one or more natural language processing techniques to ensure that the flow of the populated template is appropriate. In some embodiments, this may involve replacing or modifying language in order to achieve a particular tone or theme.

At step 714, the process 700 may involve converting the populated template from a text string into a second format. In some embodiments, converting the populated template into the media file may include converting the populated template from a text-based format to a second format (e.g., an audio or video format). An example process for converting a populated template into an audio format is described in greater detail with respect to FIG. 5 above. In some embodiments, the service provider may receive one or more constraints for the media file and may adjust content of the media file based on those constraints. For example, the service provider may receive a time slot and audio data generated using the techniques described herein may be compressed (i.e., sped up) or extended (i.e., slowed down) to fit within the received time slot. In some embodiments, gaps (periods of silence) in audio data may be removed or reduced.

At step 716, the process 700 may involve providing the generated media file to the user device. The generated media file may be incorporated into content currently being consumed by the user on a user device. In some embodiments, the service provider may provide the generated content directly to a user device. In some embodiments, the service provider may provide the generated media file to a content provider, which may in turn provide the media file to the user device.

Embodiments of the disclosure provide for a number of advantages over conventional systems. For example, the system uses a specific set of unconventional techniques in order to enable dynamic-generation of targeted media content, which is a capability not currently available in conventional advertisement serving systems. Additionally, targeted content generated in the manner described can be tweaked or modified with each iteration based on feedback (e.g., whether the advertisement resulted in a conversion or other follow up action). This enables the system to quickly assess results (e.g., in effectiveness) of various elements, which would be cost-prohibitive in conventional systems.

Figure 8:
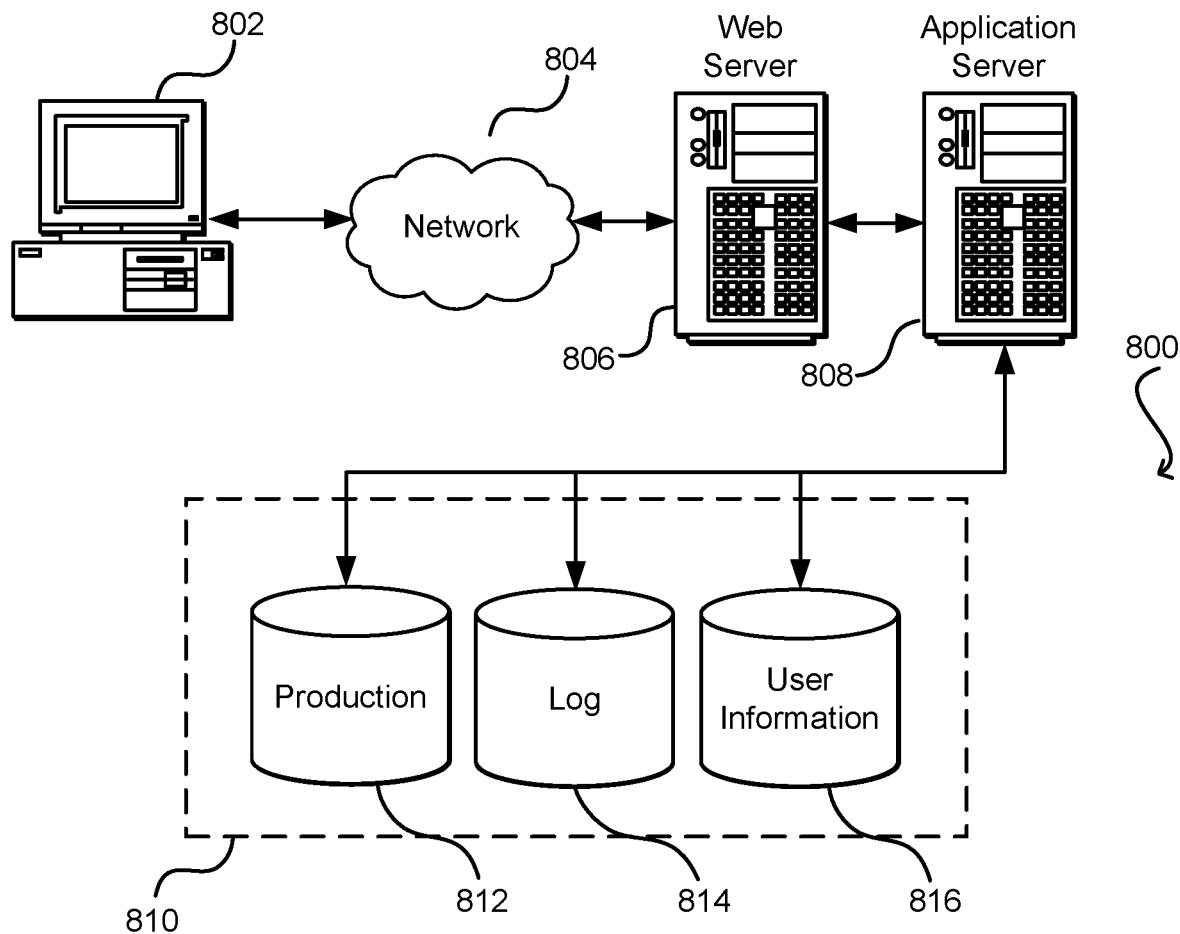
FIG. 8 illustrates aspects of an example environment for implementing aspects in accordance with various embodiments.

FIG. 8 illustrates aspects of an example environment 800 for implementing aspects in accordance with various embodiments. As will be appreciated, although a Web-based environment is used for purposes of explanation, different environments may be used, as appropriate, to implement various embodiments. The environment includes an electronic client device 802, which can include any appropriate device operable to send and receive requests, messages, or information over an appropriate network 804 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing production data 812 and user information 816, which can be used to serve content for the production side. The data store also is shown to include a mechanism for storing log data 814, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGP") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    receiving a request for a media file, the request including identifying information to be used in generation of the media file, the identifying information including a user identifier associated with the request;
    obtaining, based at least in part on the user identifier, at least one of a tone of content associated with the request for the media file or the tone of historical content previously consumed by a media device associated with the request;
    determining, based on the identifying information, a template from a plurality of templates;
    determining, based on the identifying information, a product from a plurality of products for which the media file is to be generated;
    populating the template with one or more attributes associated with the determined product;
    converting the populated template into the media file by removing or replacing one or more phrases in the populated template based at least in part on one or more natural language processing techniques; and
    providing, to the media device, the media file in response to the request.

2. The computer-implemented method of claim 1, wherein converting the populated template into the media file comprises converting the populated template from a text-based format to a second format.

3. The computer-implemented method of claim 2, wherein the second format is an audio format.

4. The computer-implemented method of claim 1, wherein the replacing includes substituting a technical term corresponding to a phrase of the one or more phrases with a colloquial term for an attribute of the one or more attributes.

5. A service provider computer comprising:
    a processor; and
    a memory including instructions that, when executed with the processor, cause the service provider computer to, at least:
        receive identifying information to be used in generating a media file for a user device, the identifying information including a user identifier associated with the user device;
        obtain, based at least in part on the user identifier, at least one of a tone of content associated with a request for generating the media file or the tone of historical content previously consumed by the user device associated with the request;
        determine, based on the identifying information, an appropriate format to be used in generating the media file;
        determine, based on the identifying information, a product from a plurality of products;

generate a text string in the appropriate format using one or more attributes associated with the determined product;

convert the text string into the media file by removing or replacing one or more phrases in the media file based at least in part on one or more natural language processing techniques; and provide the media file to the user device.

6. The service provider computer of claim 5, wherein the identifying information is received upon determining that content is being consumed via the user device.

7. The service provider computer of claim 6, wherein the identifying information comprises a content data identifier that includes a category of the content consumed via the user device.

8. The service provider computer of claim 7, wherein the appropriate format comprises selection of a template from a plurality of templates based at least in part on the category of content.

9. The service provider computer of claim 7, wherein the product is determined from the plurality of products based at least in part on the category of content.

10. The service provider computer of claim 5, wherein the appropriate format comprises selection of a template from a plurality of templates based at least in part on the user identifier.

11. The service provider computer of claim 5, wherein the product is determined from the plurality of products based at least in part on the user identifier.

12. The service provider computer of claim 5, converting the text string into the media file comprises using a text to speech synthesis application to obtain audio data.

13. A non-transitory computer readable medium storing specific computer-executable instructions that, when executed by a processor, cause a computer system to at least:

receive an indication of content being consumed via a user device, the indication including identifying information that corresponds to user identifier associated with the user device;

obtain, based at least in part on the user identifier, at least one of a tone of content associated with a request for generating a media file or the tone of historical content previously consumed by the user device associated with the request;

determine, based on the indication, a template from a plurality of templates;

determine, based on the indication, a product from a plurality of products;

populate the template with one or more attributes associated with the determined product;

convert the populated template into the media file by removing or replacing one or more phrases in the media file based at least in part on one or more natural language processing techniques; and provide the media file to the user device.

14. The non-transitory computer readable medium of claim 13, wherein the template comprises an Extensible Markup Language (xml) file.

15. The non-transitory computer readable medium of claim 14, wherein one or more gaps are removed or reduced within the media file.

16. The non-transitory computer readable medium of claim 13, wherein the instructions further cause the computer system to identify a time slot, wherein the provided media file is caused to be played within the time slot.

17. The non-transitory computer readable medium of claim 16, wherein the media file is compressed or extended to fit within the time slot.

18. The non-transitory computer readable medium of claim 13, wherein the media file is associated with an action.

19. The non-transitory computer readable medium of claim 18, wherein the action, when executed, causes the product to be obtained by a user of the user device.

* * * * *